(12) United States Patent
Hori et al.

(10) Patent No.: US 6,923,091 B2
(45) Date of Patent: Aug. 2, 2005

(54) INTERNAL COMBUSTION ENGINE WITH HYDRAULICALLY OPERATED AUTOMATIC TRANSMISSION

(75) Inventors: Yoshiaki Hori, Saitama (JP); Yoshihiro Yoshida, Saitama (JP); Seiji Hamaoka, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 86 days.

(21) Appl. No.: 10/241,652

(22) Filed: Sep. 12, 2002

(65) Prior Publication Data

US 2003/0075138 A1 Apr. 24, 2003

(30) Foreign Application Priority Data

Sep. 19, 2001 (JP) ......................................... 2001-284522

(51) Int. Cl.[7] .............................. F02B 75/32; F16K 1/00
(52) U.S. Cl. ................................ 74/606 R; 123/196 R; 123/196 A; 123/197.5; 123/884; 137/884
(58) Field of Search ..................... 74/606 R; 123/197.5, 123/90.15, 90.17, 196 R, 196 A; 192/70.12, 113.35; 137/625.65, 884; 257/129.15; 138/40; 251/117

(56) References Cited

U.S. PATENT DOCUMENTS

| | | | | |
|---|---|---|---|---|
| 4,805,490 A | * | 2/1989 | Fuehrer et al. ........... 74/606 R |
| 5,199,395 A | * | 4/1993 | Mizumura et al. ..... 123/196 AB |
| 5,575,190 A | * | 11/1996 | Hirose ....................... 74/606 R |
| 5,868,167 A | * | 2/1999 | Miki et al. ............. 137/625.65 |
| 6,021,764 A | * | 2/2000 | Koyama ..................... 123/563 |
| 6,116,223 A | * | 9/2000 | Feucht .................. 123/568.11 |
| 6,216,559 B1 | * | 4/2001 | Tanoue et al. ............ 74/606 R |
| 6,234,124 B1 | * | 5/2001 | Tsukui et al. ............ 123/90.15 |
| 6,289,859 B1 | * | 9/2001 | Fujii et al. ............... 123/90.15 |
| 6,381,957 B1 | * | 5/2002 | Hori et al. ..................... 60/436 |
| 6,443,278 B1 | * | 9/2002 | Hori et al. ................. 192/3.58 |
| 6,837,209 B2 | * | 1/2005 | Hori et al. .............. 123/196 R |
| 2003/0127143 A1 | * | 7/2003 | Hori et al. .................. 137/884 |

FOREIGN PATENT DOCUMENTS

| | | | | |
|---|---|---|---|---|
| JP | 11-115870 | * | 4/1999 | ................... 60/436 |
| JP | 2003-166619 | * | 6/2003 | ............. 123/196 R |

* cited by examiner

*Primary Examiner*—Vinh T. Luong
(74) *Attorney, Agent, or Firm*—Birch, Stewart, Kolasch & Birch, LLP (57) ABSTRACT

An internal combustion engine with a hydraulically operated automatic transmission includes a crankcase that is divided on a plane perpendicular to a crankshaft and an outer face of the crankcase in a direction of the crankshaft is covered with a crankcase cover. A transmission gear ratio of the transmission is automatically changed over by control of oil pressures to remove a valve body for readily controlling oil pressures and for raising the accessibility of maintenance. The valve body for controlling the oil pressures is mounted on an outer wall face of the crankcase cover

14 Claims, 13 Drawing Sheets

INTERNAL COMBUSTION ENGINE WITH HYDRAULICALLY OPERATED AUTOMATIC TRANSMISSION

CROSS-REFERENCE TO RELATED APPLICATIONS

The present application claims priority under 35 USC 119 to Japanese Patent Application No. 2001-284522 filed on Sep. 19,2001 the entire contents thereof is hereby incorporated by reference.

BACKGROUND OF THE INVENTION

1. Field of the Invention

This invention relates to an internal combustion engine with a hydraulically operated automatic transmission incorporated principally in a bogie car, a saddle type vehicle for traveling on the wasteland.

2. Description of Background Art

Valve bodies for controlling oil pressures of a hydraulically operated automatic transmission of a power unit are available wherein an internal combustion engine and the transmission have separate structures from each other and are disposed in a dead space in a transmission case. However, in another power unit, wherein an internal combustion engine and a transmission are formed integrally, valve bodies are in most cases arranged discretely for different functions because it is difficult to provide a collected dead space in the power unit. Where valve bodies are arranged discretely in this manner, the hydraulic circuit is complicated and the transmission efficiency of the oil pressures is deteriorated. Further, a separate part such as a valve cover is required. In addition, it is difficult to take out a valve in order to adjust the valve.

SUMMARY AND OBJECTS OF THE INVENTION

The present invention contemplates raising the ease of maintenance by collecting, in a power unit wherein an internal combustion engine and a transmission are formed integrally with each other, valves for controlling oil pressures of the transmission at one place to form a valve body for the oil pressure control and making it possible to remove the valve body readily. Further the present invention contemplates achieving a compact configuration of the transmission by devising the formation of oil paths.

The present invention solves the problems described above by providing an internal combustion engine with a hydraulically operated automatic transmission wherein a crankcase is divided on a plane perpendicular to a crankshaft and an outer face of the crankcase in a direction of the crankshaft that is covered with a crankcase cover. In addition, a transmission gear ratio of the transmission is automatically changed over by control of oil pressure wherein a valve body for controlling the oil pressures is mounted on an outer wall face of the crankcase cover.

Since the present invention has the configuration described above, upon maintenance, the valve body can be readily removed. Further, since all valves are collected at one place to form the valve body, maintenance and inspection are easy.

According to the present invention, oil paths for the oil pressure control is formed in the crankcase cover on which the valve body is mounted. Since the present invention has the configuration just described, no pipe is exposed to the outside and the configuration of the transmission becomes compact.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
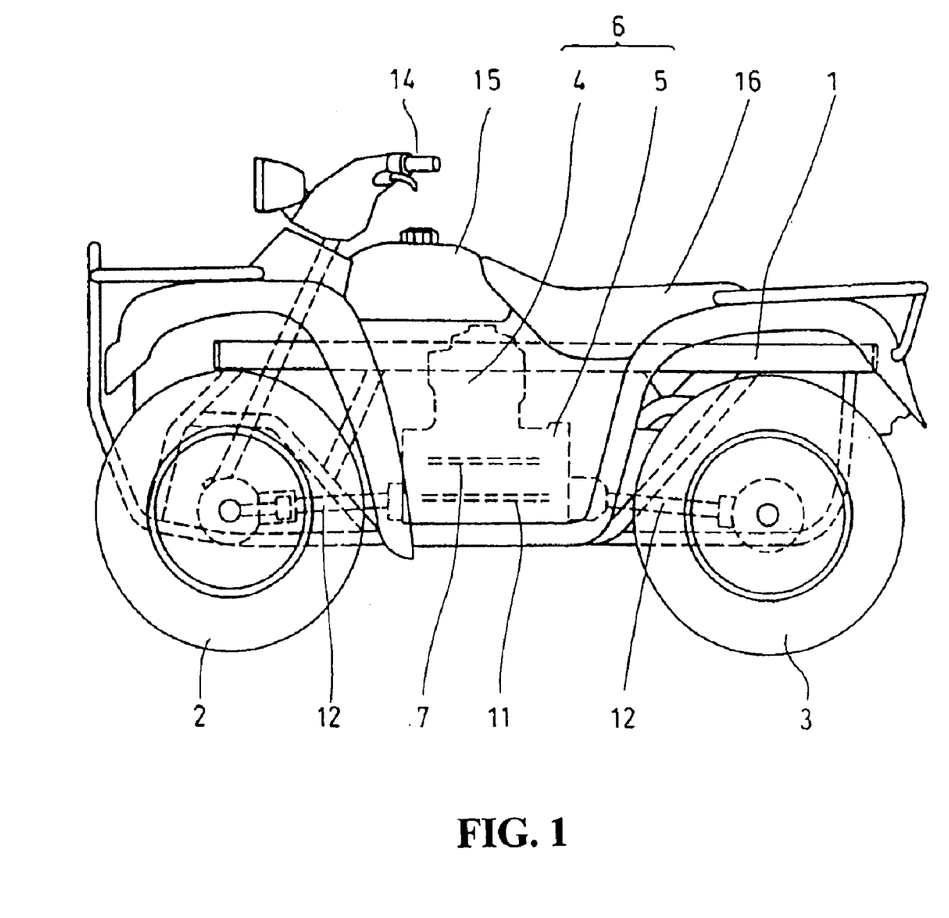
FIG. 1 is a side elevational view of a four-wheeled bogie car, a saddle type vehicle for traveling on the wasteland, in which an internal combustion engine of the present invention is incorporated.

FIG. 1 is a side elevational view of a four-wheeled bogie car, a saddle type vehicle for traveling on the wasteland, in which an internal combustion engine with a hydraulically operated automatic transmission of the present invention is incorporated. The present bogie car includes a pair of left and right front wheels 2 and a pair of left and right rear wheels 3 provided at front and rear portions of a body frame 1. A power unit 6 is provided wherein an internal combustion engine 4 and a transmission 5 are integrated with each other and are supported at a middle portion of the body frame 1. The power unit 6 is disposed such that a crankshaft 7 is directed in the forward and rearward direction of the vehicle body. Rotation of the crankshaft 7 is transmitted to an output power shaft 11 through a main shaft 8, a countershaft 9 and an intermediate shaft 10 (all shown in FIG. 4) of the transmission. All of the shafts extend in parallel to the crankshaft and are disposed in the forward and rearward direction of the vehicle body. The front wheels 2 are driven by a front wheel driving shaft 12 connecting to a front end of the output power shaft 11. The rear wheels 3 are driven by a rear wheel driving shaft 13 connecting to a rear end of the output power shaft 11. A steering handle bar 14, a fuel tank 15 and a saddle type seat 16 are provided at an upper portion of the vehicle body.

Figure 2:
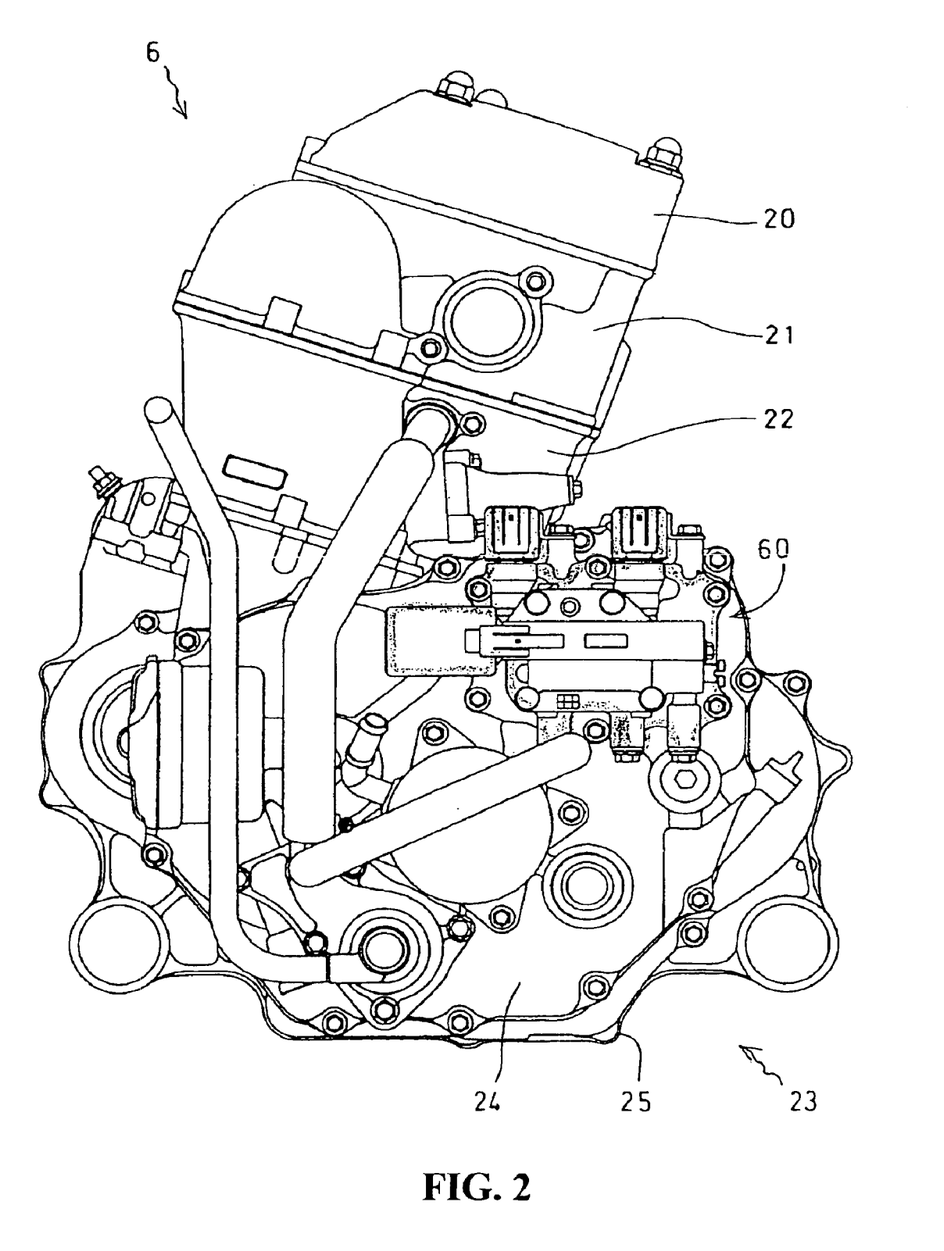
FIG. 2 is a front elevational view of a power unit of the present invention.
Figure 3:
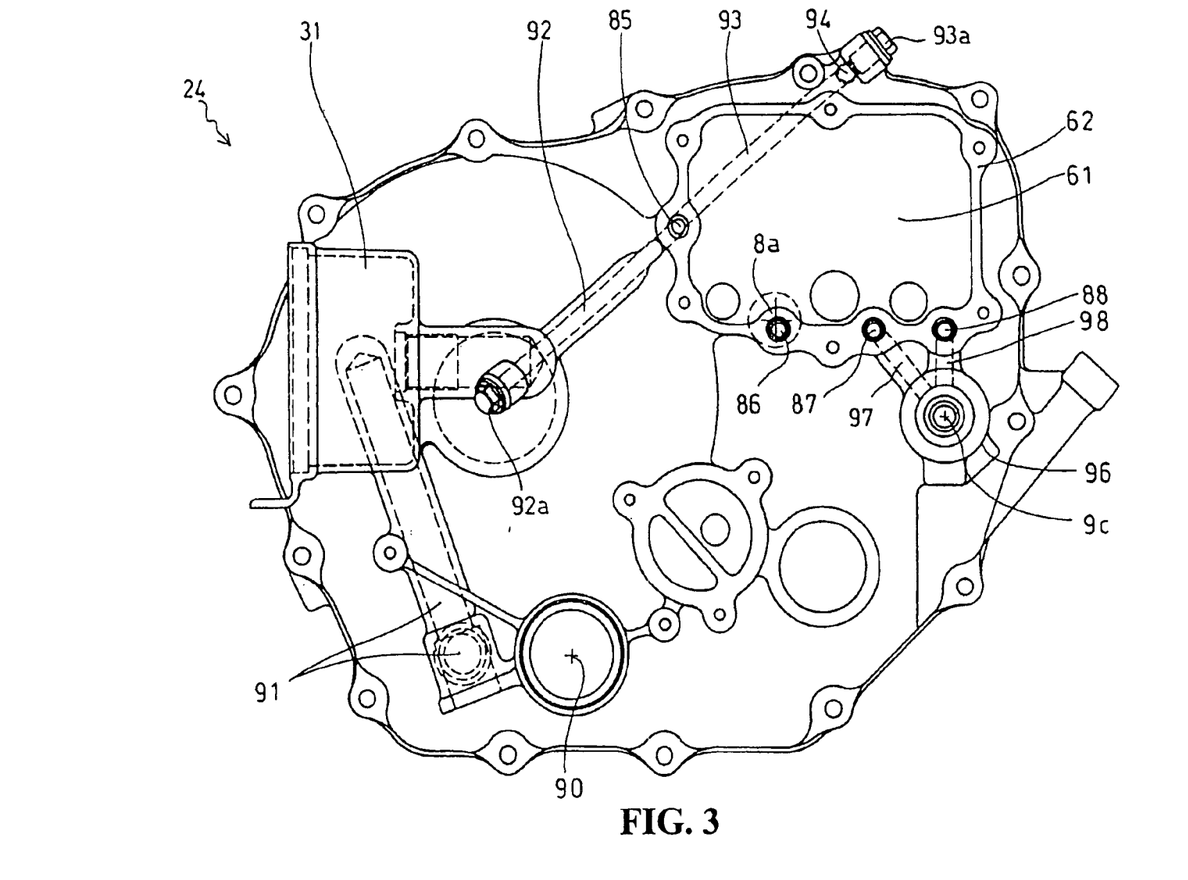
FIG. 3 is a view of a front crankcase cover as viewed from the front.

FIG. 2 is a front elevational view of the power unit 6 of the present invention illustrating the front face of the power unit 6 as viewed from the front. A body portion of the power unit 6 is roughly composed of four parts, a cylinder head cover 20, a cylinder head 21, a cylinder block 22 and a crankcase 23. Further, the crankcase 23 is divided into four portions on a plane perpendicular to the crankshaft 7 and composed of a front crankcase cover 24, a front crankcase 25, a rear crankcase 26 and a rear crankcase cover 27 from the front (they are partly shown in FIGS. 5 and 6). The front crankcase cover 24 appears in FIG. 2, and the front crankcase 25 appears a little around the front crankcase cover 24. Various apparatus and pipes are mounted on a front face of the front crankcase cover 24. FIG. 3 is a view of the front crankcase cover 24 on which the apparatus mentioned are not mounted as viewed from the front, and FIG. 4 is a view of the front crankcase 25 as viewed from the front.

Figure 4:
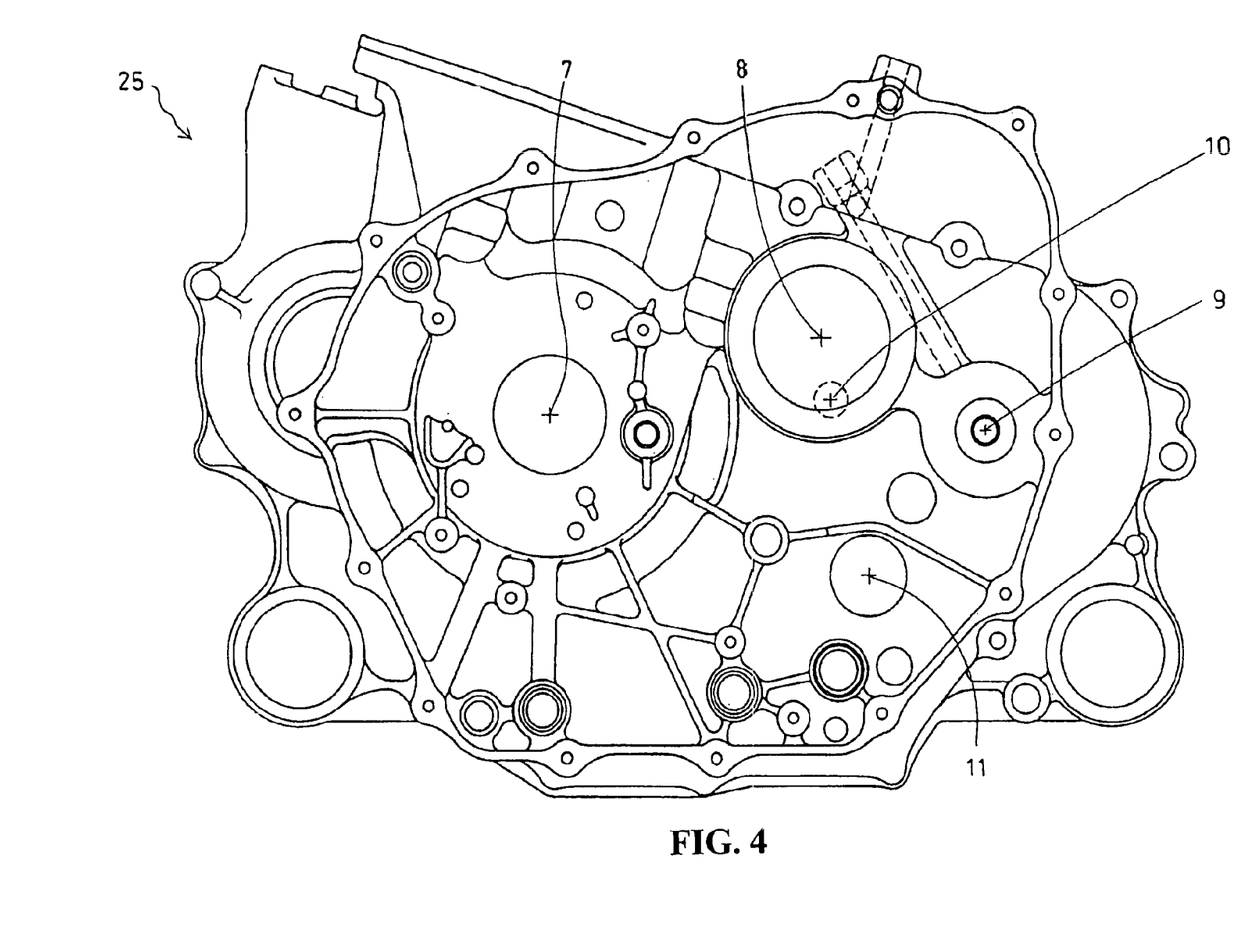
FIG. 4 is a view of a front crankcase as viewed from the front.
Figure 5:
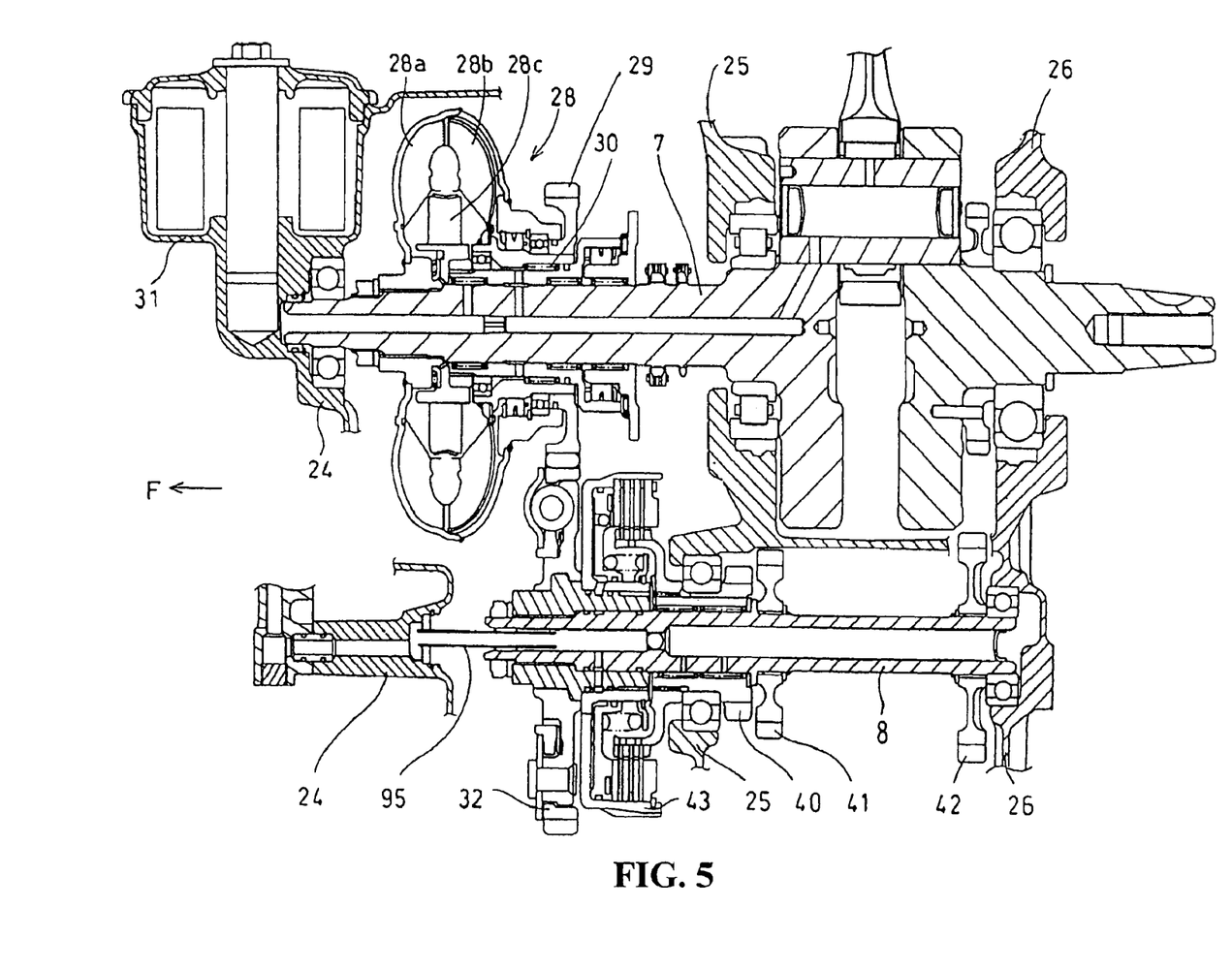
FIG. 5 is a vertical sectional view of the inside of a crankcase showing a relationship between a crankshaft and a main shaft.
Figure 6:
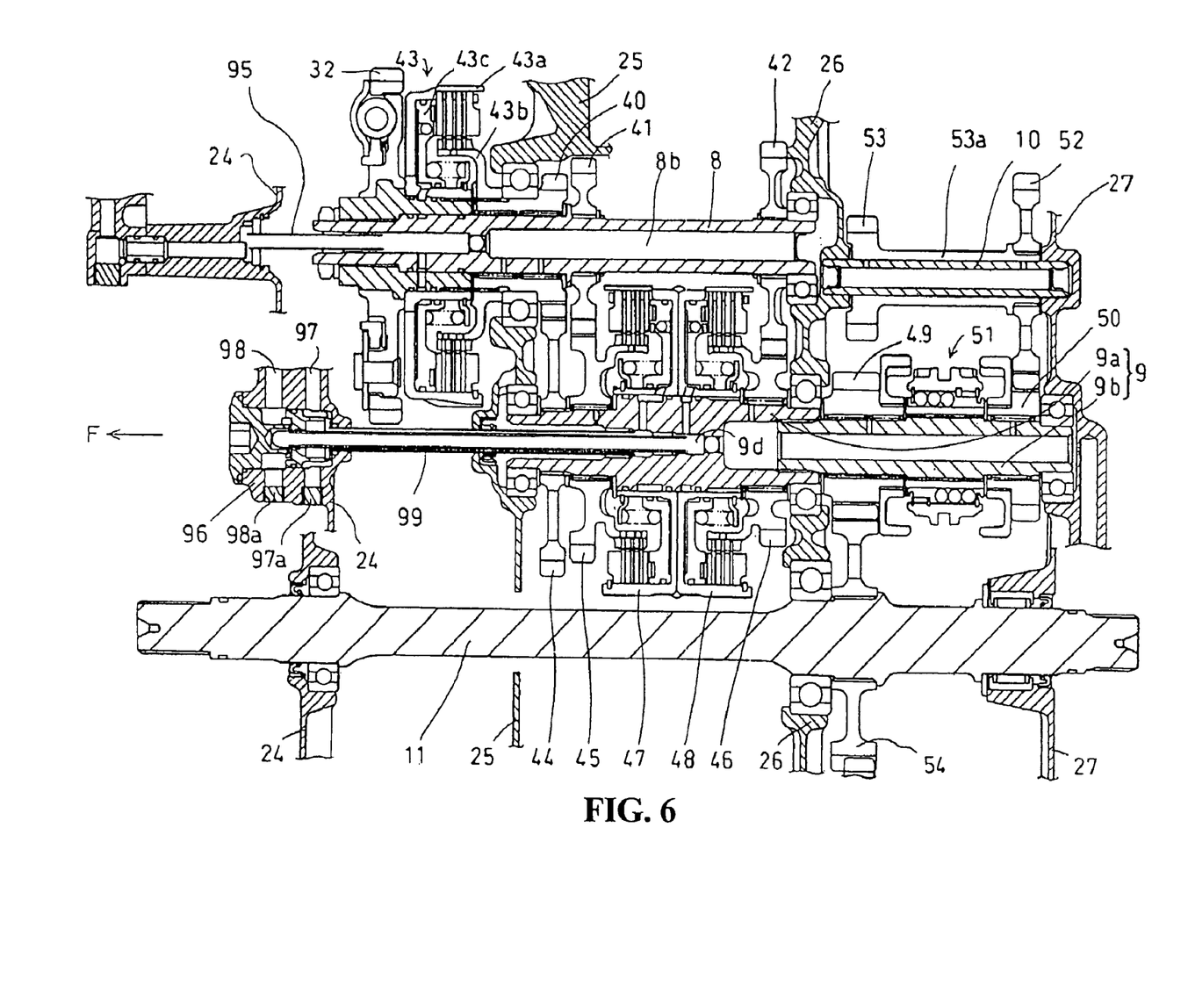
FIG. 6 is a vertical sectional view of the inside of the crankcase showing a relationship between the main shaft, a countershaft, an intermediate shaft and an output power shaft.

The positions of the crankshaft 7, main shaft 8 of the transmission, countershaft 9, intermediate shaft 10 and output power shaft 11 are shown in FIG. 4. FIGS. 5 and 6 are vertical sectional views of the inside of the crankcase taken along principal shafts in the crankcase. FIG. 5 shows a relationship between the crankshaft 7 and the main shaft 8 and FIG. 6 shows a relationship among the main shaft 8, countershaft 9, intermediate shaft 10 and output power shaft 11. In FIG. 5, an arrow mark F denotes the forward direction.

FIG. 5 illustrates a power transmission mechanism between the crankshaft 7 and the main shaft 8. The crankshaft 7 is supported on the front and back crankcases 25 and 26 through bearings. A forward extension of the crankshaft 7 is supported on the front crankcase cover 24 through a bearing. A driving gear wheel 29 is provided on the crankshaft 7 through a torque converter 28. The driving gear wheel 29 is supported for rotation on the crankshaft 7 through a needle bearing 30. The torque converter 28 includes a pump impeller 28a secured to the crankshaft 7, a turbine runner 28b that is opposed to the pump impeller 28a, and a stator 28c. The driving gear wheel 29, which is rotatable relative to the crankshaft 7, is coupled to the turbine runner 28b such that driving gear wheel 29 can transmit power from the crankshaft when the torque converter 28 is in a coupling state. An oil filter 31 is provided on the front crankcase cover 24 which supports a front end portion of the crankshaft 7. A driven gear wheel 32, which is normally held in meshing engagement with the driving gear wheel 29, is secured to a front end portion of the main shaft 8 of the transmission. When the torque converter 28 enters a coupling state, rotation of the crankshaft 7 is transmitted to the main shaft 8 through the driving gear wheel 29 and the driven gear wheel 32.

FIG. 6 illustrates a power transmission mechanism transmitted between the main shaft 8, countershaft 9, intermediate shaft 10 and output power shaft 11 of the transmission. The main shaft 8 of the transmission is supported on the front and rear crankcases 25 and 26 through bearings. A first speed driving gear wheel 40, a second speed driving gear wheel 41 and a third speed driving gear wheel 42, which individually have different numbers of teeth in accordance with transmission ratios, are provided on the main shaft 8.

The second speed driving gear wheel 41 and the third speed driving gear wheel 42 are secured gears that secured to the main shaft 8. The first speed driving gear wheel 40 is supported for rotation on the main shaft 8 through a needle bearing. In the following description, a gear wheel supported for rotation with respect to a rotary shaft through a needle bearing is referred to as a floating gear wheel. A first speed hydraulic multiple disk clutch 43 is interposed between the main shaft 8 and the first speed driving gear wheel 40. This clutch includes a clutch outer member 43a secured to the main shaft and a clutch inner member 43b connected to the first speed driving gear wheel 40 which is a floating gear wheel as mentioned above. When operating oil is supplied between the clutch outer member 43a of the clutch and a pressure plate 43c so as to be pressurized to move the pressure plate 43c to place the clutch into a coupling state, the first speed driving gear wheel 40 is secured to the main shaft 8.

The countershaft 9 includes a front portion 9a and a rear portion 9b coupled into a unitary member. The countershaft 9 is supported on the front crankcase 25, rear crankcase 26 and rear crankcase cover 27 through bearings. A first speed driven gear wheel 44, a second speed driven gear wheel 45 and a third speed driven gear wheel 46, which are normally held in meshing engagement with the first speed driving gear wheel 40, second speed driving gear wheel 41 and third speed driving gear wheel 42 described above, respectively, are provided on the front portion 9a of the countershaft 9. While the first speed driven gear wheel 44 is a secured gear wheel secured to the shaft, the second speed driven gear wheel 45 and the third speed driven gear wheel 46 are floating gear wheels. A second speed hydraulic multiple disk clutch 47 and a third speed hydraulic multiple disk clutch 48 are interposed between the countershaft 9 and the floating gear wheels, respectively. Each of the clutches includes a clutch outer member secured to the countershaft 9 and a clutch inner member connected to the corresponding floating gear wheel. When operating oil is supplied between the clutch outer member of each of the clutches and a pressure plate so as to be pressurized to move the pressure plate to place the clutch into a coupling state, the floating gear wheel is secured to the countershaft 9 so that it can transmit power of the second speed or the third speed.

A forward rotation driving gear wheel 49 and a reverse rotation driving gear wheel 50 are provided at the rear portion 9b of the countershaft 9. They are floating gear wheels, and one of them with a manually operable dog clutch 51 being provided intermediately between them, is engaged is secured to the shaft.

The intermediate shaft 10 is supported on the rear crankcase 26 and the rear crankcase cover 27. A first intermediate gear wheel 52, normally held in meshing engagement with the reverse rotation driving gear wheel 50, and a second intermediate gear wheel 53 connected at a long sleeve portion 53a thereof to the first intermediate gear wheel 52 are supported for rotation on the intermediate shaft 10.

The output power shaft 11 is supported on the front crankcase cover 24, rear crankcase 26 and rear crankcase cover 27 through bearings. The output power shaft 11 extends through the front crankcase 25 without contacting with the front crankcase 25. A driven gear wheel 54, normally held in meshing engagement with the forward rotation driving gear wheel 49, is secured to the output power shaft 11. The driven gear wheel 54 is driven to rotate forwardly or reversely through one of the gear wheels with which the dog clutch 51 described above is engaged to rotate the output power shaft 11 in a direction conforming with the forward movement or the backward movement of the vehicle. The reverse rotation driving is controlled so that the output power shaft 11 is connected only when the countershaft is rotating at the first speed.

All of the gear wheels of the transmission described above are of the normally meshing type. The one of the change gear ratios that should be executed depends upon the hydraulic multiple disk clutches 43, 47 and 48 that is placed into a connecting state. This hydraulic control is performed by a valve body 60 wherein directional control valves, solenoids for actuating them and so forth are assembled collectively as a hydraulic control apparatus, and is mounted, as a position thereof, on the front face of the front crankcase cover 24 as shown in FIG. 2. The valve body 60 is mounted at a mounting recessed portion 61 of the front crankcase cover 24 shown in FIG. 3 and is secured to a mounting face 62 around the mounting recessed portion 61 through a gasket which is hereinafter described in detail. In the mounted state of the valve body 60, a front half thereof is exposed to the outside of the front crankcase cover 24, and a rear half thereof is buried in the mounting recessed portion 61 of the front crankcase cover 24. The mounting face 62 is formed in parallel to the parting plane of the crankcase.

Figure 7:
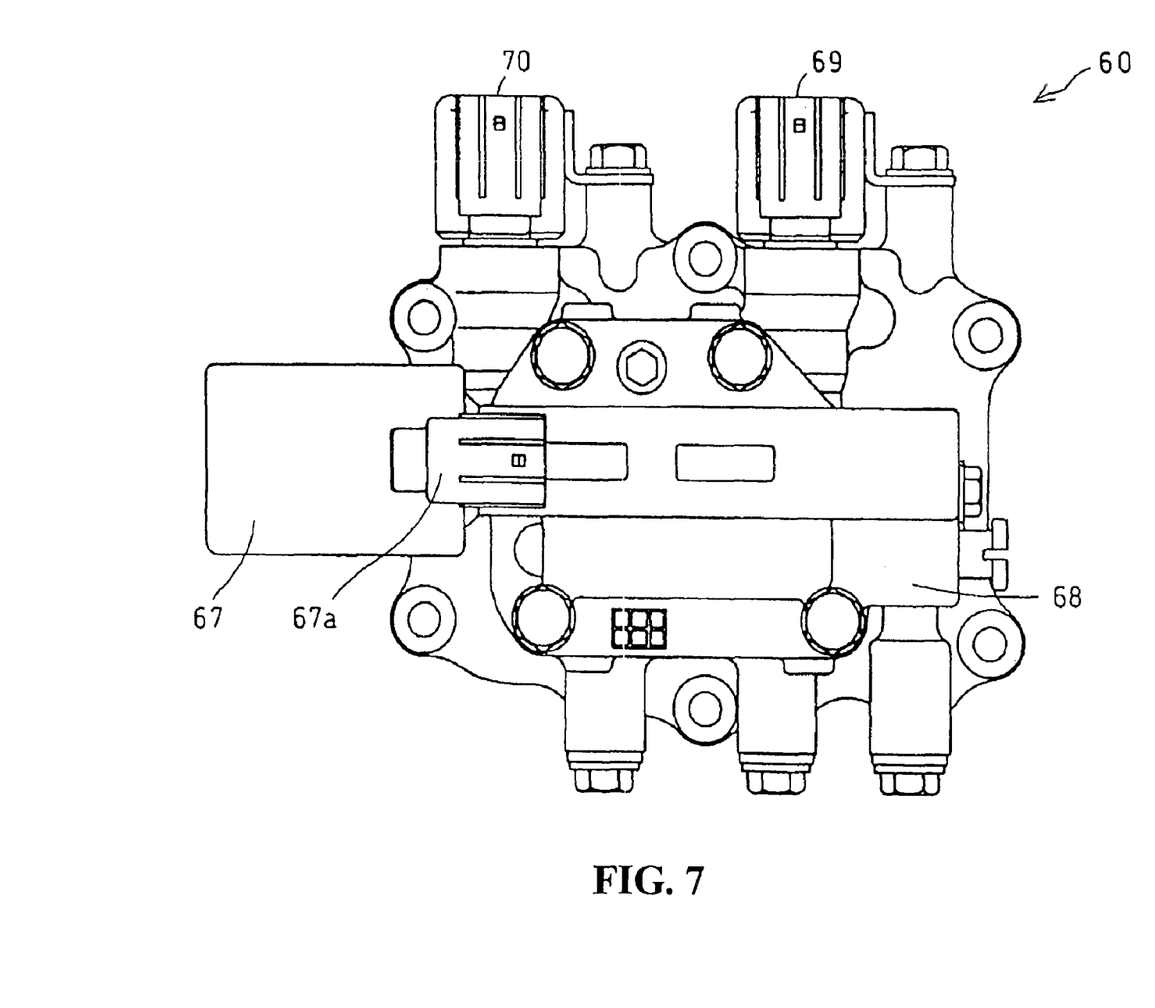
FIG. 7 is a front elevational view of a valve body.
Figure 8:
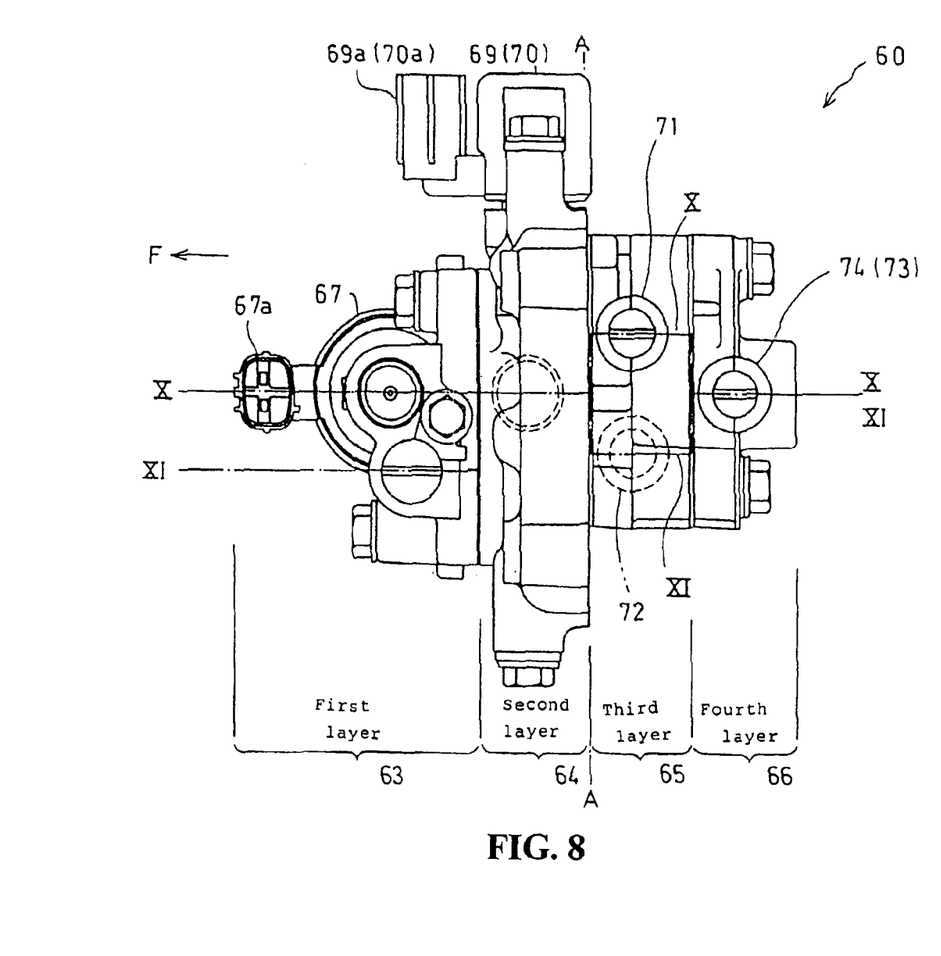
FIG. 8 is a side elevational view of the valve body as viewed from the right side.
Figure 9:
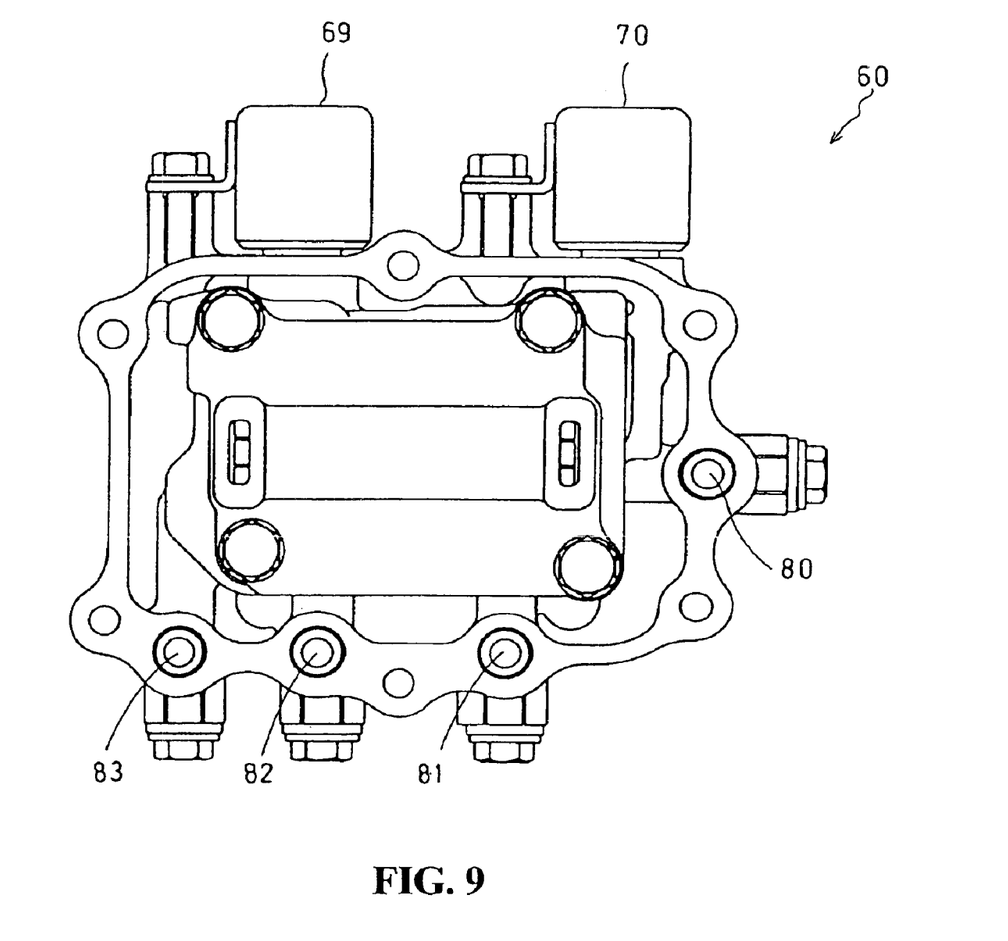
FIG. 9 is a rear elevational view of the valve body.
Figure 10:
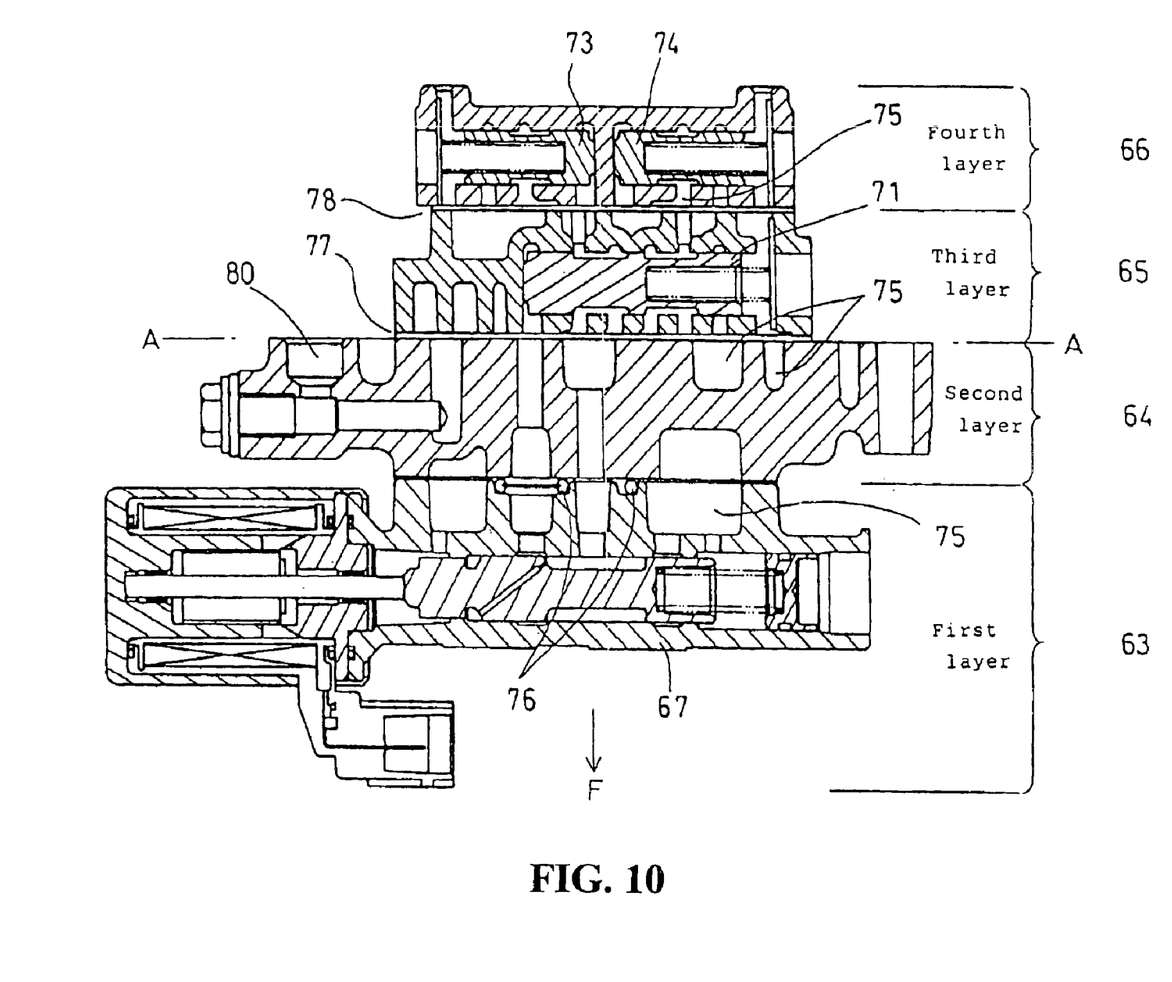
FIG. 10 is a sectional view taken along line X—X of FIG. 8.
Figure 11:
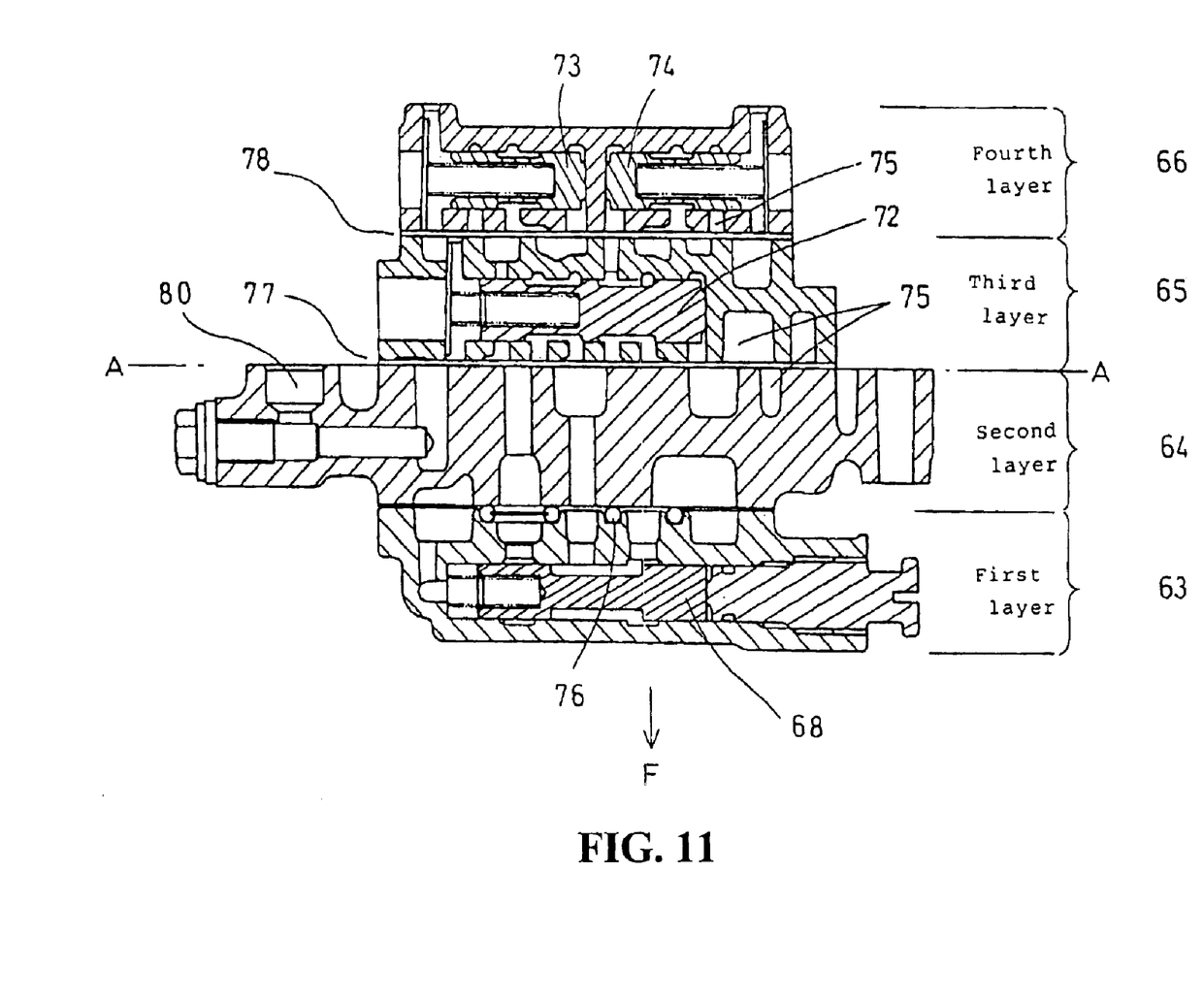
FIG. 11 is a sectional view taken along line XI—XI of FIG. 8.

FIG. 7 is a front elevational view of the valve body 60, FIG. 8 is a side elevational view of the valve body 60 as viewed from the right side, FIG. 9 is a rear elevational view of the valve body 60, FIG. 10 is a sectional view taken along line X—X of FIG. 8, and FIG. 11 is a sectional view taken along line XI—XI of FIG. 8. In FIGS. 8, 10 and 11, an arrow mark F denotes the forward direction. The apparatus as set forth in the above figures is generally composed of four layers, a first layer 63, a second layer 64, a third layer 65 and a fourth layer 66 in that order from the front. A rear face of the second layer, that is, a face indicated by A—A in FIGS. 8, 10 and 11, is a face which contacts with and is secured to the mounting face 62 of the front crankcase cover through the gasket by means of bolts. The third layer 65 and the fourth layer 66 of the valve body 60 are accommodated in the mounting recessed portion 61 of the front crankcase cover.

A linear solenoid valve 67 and an emergency valve 68 are provided in the first layer 63 of the valve body 60. An electric wire connecting terminal 67a is provided for the solenoid. A first-second speed change-over solenoid valve 69 and a second-third speed change-over solenoid valve 70 are provided in the second layer 64. Electric wire connecting terminals 69a and 70a are provided for the solenoids. A first-second speed change-over spool valve 71 and a second-third speed change-over spool valve 72 each having a spool which is hydraulically actuated in response to an ON/OFF of the corresponding solenoid valve are provided in the third layer 65. The spool valves are valves for controlling the supply of operating oil to the hydraulic multiple disk clutches 43, 47 and 48 described hereinabove. Hydraulic control valves 73 and 74 are provided in the fourth layer 66. The control valves are valves for controlling the discharge of operating oil from the hydraulic multiple disk clutches 43, 47 and 48 as described hereinabove.

Figure 12:
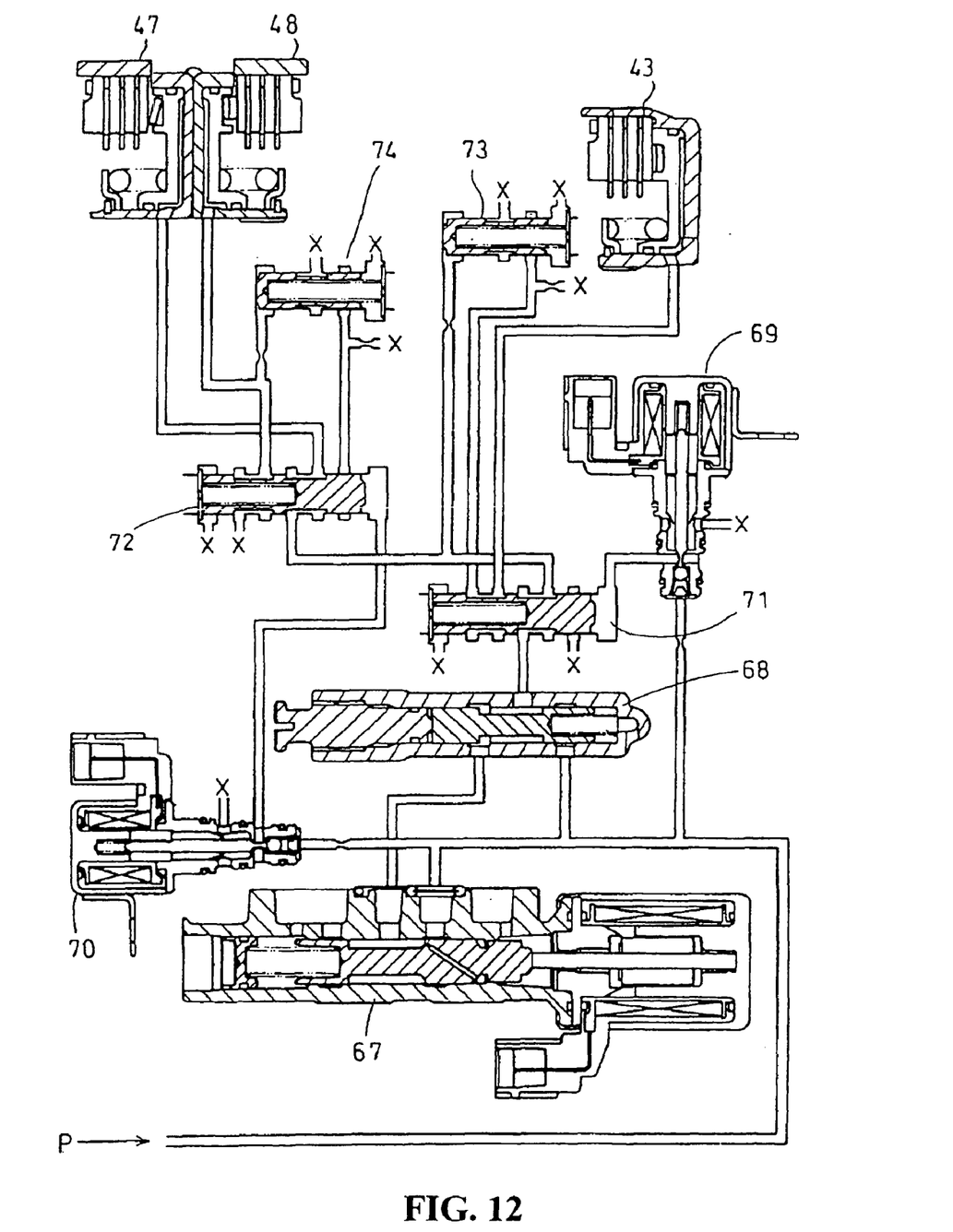
FIG. 12 is a hydraulic system diagram of transmission control apparatus accommodated in the valve body.

FIG. 12 is a system diagram of the operating oil for connecting the various apparatus described hereinabove. Referring to FIG. 12, all of the apparatus other than the hydraulic multiple disk clutches 43, 47 and 48 are incorporated in the valve body 60 as described above. Part of oil fed from an oil pump not shown, which is provided in the crankcase 23 and driven by the internal combustion engine 4, and passing the filter is supplied as operating oil for operating the hydraulic multiple disk clutches into the present system from an arrow mark P at a lower portion of FIG. 12. A portion denoted by X in FIG. 12 is an exhaust port for oil. Operating oil discharged from the portions X after use is fed into an oil tank not shown. The portion of the oil that passes through the filter is sent to various portions, though not shown in the system diagram, as operating oil for the torque converter or as lubricating oil for the transmission or valve motion cams.

Referring to FIG. 12, the operating oil passes through the linear solenoid valve 67 and further through the change-over spool valves and is supplied to the clutch. The linear solenoid valve 67 is a valve for moderating the rise of the oil pressure upon starting of supply of the operating oil. The operating oil having passed through the linear solenoid valve 67 is sent to the change-over spool valves through the emergency valve 68. The emergency valve 68 normally has a role of merely providing a path for the operating oil. However, if the linear solenoid valve 67 fails, then the emergency valve 68 provides a new route for communicating the operating oil without passing through the linear solenoid valve 67, and the emergency valve 68 is manually operated when the linear solenoid valve fails.

The first-second speed change-over solenoid valve 69 and the second-third speed change-over solenoid valve 70 control the ON/OFF of the oil pressures for driving the spools of the first-second speed change-over spool valve 71 and the second-third speed change-over spool valve 72, respectively. The destinations of supply of the operating oil from the spool valves 71 and 72 depend upon the positions of the spools. If the operating oil is supplied to one of the hydraulic multiple disk clutches 43, 47 and 48, then the clutch is placed into a connecting state, and the floating gear wheel connecting to the clutch is secured to the shaft and speed changing is performed at a change gear ratio defined by the gear wheel. At this time, it is necessary to discharge the operating oil from the hydraulic multiple disk clutch which has been in a connecting state before the speed changing. The discharged oil is discharged through the hydraulic control valve 73 or 74 which is controlled by the oil pressure to form a suitable oil path in the inside thereof.

Referring to FIGS. 10 and 11, a large number of oil paths 75 of the hydraulic system shown in FIG. 12 are formed on each face of each of the layers of the valve body 60 that is opposed to an adjacent one of the layers. Further, at each portion in each of the layers at which it is necessary to communicate the oil paths on the front face and the back face with each other, an oil path perpendicular to the opposing faces is formed through the inside of the layer. O-snap rings 76 are interposed at communicating portions of the oil paths of the first and second layers at the opposing faces of the two layers to prevent leakage of oil. Between the opposing faces of the second layer and the third layer and between the opposing faces of the third layer and the fourth layer, plates 77 and 78 made of steel and having small holes provided at predetermined communicating locations thereof are interposed, respectively.

Referring to FIG. 9, an entrance 80 is provided for operating oil to flow to the valve body 60 with an exit 81 for operating oil to flow toward the first speed hydraulic multiple disk clutch and an exit 82 for operating oil to flow towards the second speed hydraulic multiple disk clutch. In addition, an exit 83 is provided for operating oil to flow towards the third speed hydraulic multiple disk clutch. The entrance 80 for the operating oil is also shown in FIGS. 10 and 11.

Figure 13:
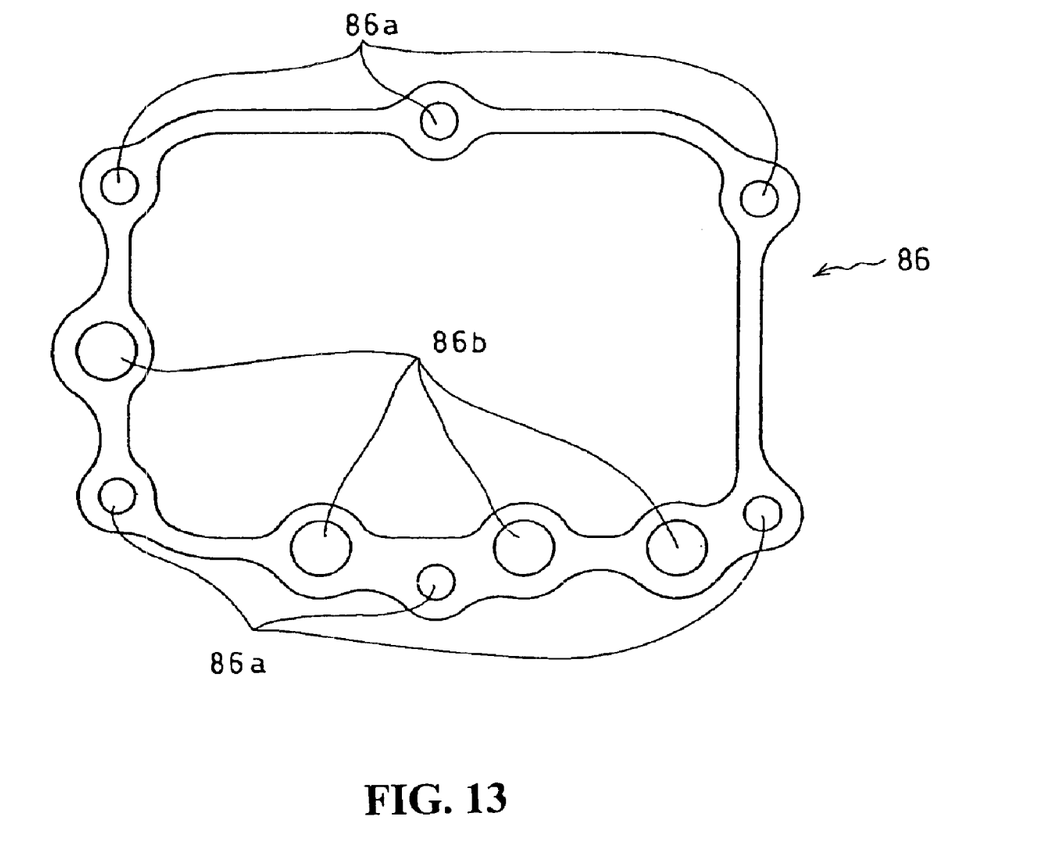
FIG. 13 is a plan view of a gasket for mounting the valve body.

Openings of the front crankcase cover 24 side which correspond to the entrance 80 and the exits 81, 82 and 83 for operating oil shown in FIG. 9 are an operating oil supply port 85 to the valve body 60, an entrance 86 for operating oil towards the first speed hydraulic multiple disk clutch, an entrance 87 for operating oil towards the second speed hydraulic multiple disk clutch, and an entrance 88 for operating oil towards the third speed hydraulic multiple disk clutch provided on the valve body mounting face 62 shown in FIG. 3. When the valve body 60 is mounted on the mounting face 62, a gasket 89 shown in FIG. 13 is interposed therebetween. Small diameter holes 89a are formed in the gasket as mounting bolt holes. Large diameter holes 89b are formed as oil paths for operating oil.

Referring to FIG. 3, an extension position 90 is provided as a pump axial center line of the oil pump not shown. The oil pump is provided between the front crankcase cover 24 and the front crankcase 25. Oil supplied from the oil pump is fed to the oil filter 31 through an oil path 91 perforated in the inside of a wall face of the front crankcase cover 24. The oil is filtered to remove foreign articles therefrom by the filter and is sent out through another oil path 92. Thereafter, part of the oil is sent from the operating oil supply port 85 to the valve body 60. The other part of the oil is sent out to lubrication requiring locations through an oil path 93 and another oil path 94 which extends perpendicularly to the oil path 93 towards the front crankcase 25.

In FIG. 3, an extension position 8a is provided of the center line of the main shaft 8, not shown, of the transmission. Operating oil sent out from the valve body 60 to the entrance 86 for operating oil towards the first speed hydraulic multiple disk clutch is sent from the rear face of the front crankcase cover 24 to a main shaft center hole 8b through an operating oil supplying pipe 95 (shown in FIGS. 5 and 6) and is supplied to the first speed hydraulic multiple disk clutch 43.

In FIG. 3, an extension position 9c is provided of the center line of the countershaft 9. An oil path connecting portion 96 is provided at this portion of the front crankcase cover 24, and oil paths 97 and 98 are perforated from the entrance 87 for supplying operating oil towards the second speed hydraulic multiple disk clutch and the entrance 88 for operating oil towards the third speed hydraulic multiple disk clutch to the oil path connecting portion 96, respectively. The operating oil supplied to the entrance 87 or the entrance 88 for operating oil from the valve body 60 passes through either one of inner and outer flow paths of an operating oil supplying duplex tube 99 (refer to FIG. 6) extending from the oil path connecting portion 96 to a center hole 9d of the countershaft 9 and is supplied to the second speed hydraulic multiple disk clutch 47 or the third speed hydraulic multiple disk clutch 48.

The oil paths provided in the front crankcase cover 24 described above are perforated from the outer face of the front crankcase cover 24, and linear short oil paths are in communication with each other in the inside of the front crankcase cover 24 to form the long bent oil paths. Opening ends of the oil paths formed upon production towards the outside of the front crankcase cover are closed up with blocking bolts. Blocking bolts 92a and 93a in FIG. 3 and blocking bolts 97a and 98a in FIG. 6 are provided. Similar oil paths are formed also in the front and rear crankcases and the rear crankcase cover and are utilized as supplying paths for lubricating oil.

As described in detail above, in the present embodiment, since a valve body for controlling oil pressures is mounted on an outer wall face of a crankcase cover, the valve body can be removed readily upon maintenance. Further, since all valves are collected at a single place to form the valve body, maintenance and checking are easy.

Further, since oil pressure controlling oil paths are formed in the crankcase cover on which the valve body is mounted, no pipe is exposed to the outside and the configuration of the transmission is compact. Further, since a mounting face of the valve body is formed in parallel to a parting plane of the crankcase, working standards common to those of the parting plane of the crankcase can be used and it can be readily worked on.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An internal combustion engine with a hydraulically operated automatic transmission having a crankshaft and an outer face of a crankcase in a direction of said crankshaft is covered with a crankcase cover and a transmission gear ratio of said transmission is automatically changed over by control of oil pressures, comprising:

a valve body including a plurality of layers for controlling the oil pressures, said valve body being mounted on an outer wall face of said crankcase cover;

oil paths for the oil pressure control being formed in said crankcase cover on which said valve body is mounted; and an oil filter being mounted on said crankcase cover, said oil filter being operatively connected to said valve body by said oil paths.

2. The internal combustion engine with a hydraulically operated automatic transmission according to claim 1, wherein said valve body includes four layers.

3. The internal combustion engine with a hydraulically operated automatic transmission according to claim 2, wherein a first layer includes a linear solenoid valve operatively connected to a clutch for supplying oil pressure thereto.

4. The internal combustion engine with a hydraulically operated automatic transmission according to claim 3, wherein the first layer further includes an emergency valve wherein oil passing through said linear solenoid valve is supplied to a change-over spool valve.

5. The internal combustion engine with a hydraulically operated automatic transmission according to claim 2, wherein a second layer includes a first-second speed change-over solenoid valve and a second-third speed change-over solenoid valve for controlling an ON/OFF of the oil pressure.

6. The internal combustion engine with a hydraulically operated automatic transmission according to claim 2, wherein a third layer includes a first-second speed change-over spool valve and a second-third speed change-over valve each including a spool hydraulically actuated in response to the oil pressure.

7. The internal combustion engine with a hydraulically operated automatic transmission according to claim 2, wherein a fourth layer includes hydraulic control valves for controlling a discharge of operating oil from hydraulic multiple clutches.

8. A valve for use with an internal combustion engine with a hydraulically operated automatic transmission comprising:

a crankcase having a crankshaft mounted within;

an outer face of said crankcase, in a direction of said crankshaft, being covered with a crankcase cover;

a transmission gear ratio of said transmission being automatically changed over by control of oil pressures; and a valve body including a plurality of layers for controlling the oil pressures, said valve body being mounted on an outer wall face of said crankcase cover;

oil paths for the oil pressure control being formed in said crankcase cover on which said valve body is mounted; and an oil filter being mounted on said crankcase cover, said oil filter being operatively connected to said valve body by said oil paths.

9. The valve for use with an internal combustion engine with a hydraulically operated automatic transmission according to claim 8, wherein said valve body includes four layers.

10. The internal combustion engine with a hydraulically operated automatic transmission according to claim 9, wherein a first layer includes a linear solenoid valve operatively connected to a clutch for supplying oil pressure thereto.

11. The internal combustion engine with a hydraulically operated automatic transmission according to claim 10, wherein the first layer further includes an emergency valve wherein oil passing through said linear solenoid valve is supplied to a change-over spool valve.

12. The internal combustion engine with a hydraulically operated automatic transmission according to claim 9, wherein a second layer includes a first-second speed change-over solenoid valve and a second-third speed change-over solenoid valve for controlling an ON/OFF of the oil pressure.

13. The internal combustion engine with a hydraulically operated automatic transmission according to claim 9, wherein a third layer includes a first-second speed change-over spool valve and a second-third speed change-over valve each including a spool hydraulically actuated in response to the oil pressure.

14. The internal combustion engine with a hydraulically operated automatic transmission according to claim 9, wherein a fourth layer includes hydraulic control valves for controlling a discharge of operating oil from hydraulic multiple clutches.

\* \* \* \* \*